Aug. 23, 1927. C. W. CANINE Re. 16,717

LAUNDRY MARKING TAG

Original Filed April 19, 1921

INVENTOR:

Chester W. Canine

BY Allen & Allen

ATTORNEYS.

Reissued Aug. 23, 1927. Re. 16,717

UNITED STATES PATENT OFFICE.

CHESTER W. CANINE, OF CINCINNATI, OHIO.

LAUNDRY-MARKING TAG.

Original No. 1,571,792, dated February 2, 1926, Serial No. 462,565, filed April 19, 1921. Application for reissue filed April 13, 1927, Serial No. 184,130.

My invention relates to tags for the marking of laundry, although I do not wish to limit my invention to this use alone, as others might readily develop.

In the past the method used to mark laundry has been to imprint in indelible ink upon the garment or article to be laundered some given sign, number or letter, which said mark remains visible after the article has gone through the various machines involved in the washing and ironing of the fabric.

For articles so dark as to form no basis for an ink mark the practice is either to staple onto the article a fabric tag, which is then marked in ink, or to pin on some kind of an identifying tag.

As is evident, the former practice is bad because it leaves a mark on the finished article which in many cases is very objectionable, and the latter practice is faulty because where the tag is loosely pinned or stapled on it will come off while the article is being washed and if it is tightly put on it cannot be removed without danger of tearing the garment.

It is the object of my invention to provide a marking tag for use especially in laundries which can be readily removed from the article before it is sent home from the laundry and will stay in place in the laundry machines and be removable without chance of tearing the garment.

This I accomplish by the stitching of a double piece of fabric on both sides of the garment, whereby the stitches may be forcibly parted with all the strain thereon taken up by the parts of the tag on both sides of the goods, so that in effect the garment is inserted in the tag and never torn from the tag since the tag only is parted or assembled over the article and the only mark left on the fabric is the line of stitches.

I accomplish the above by that certain construction and arrangement of parts to be hereinafter more specifically pointed out and claimed.

Figure 1:
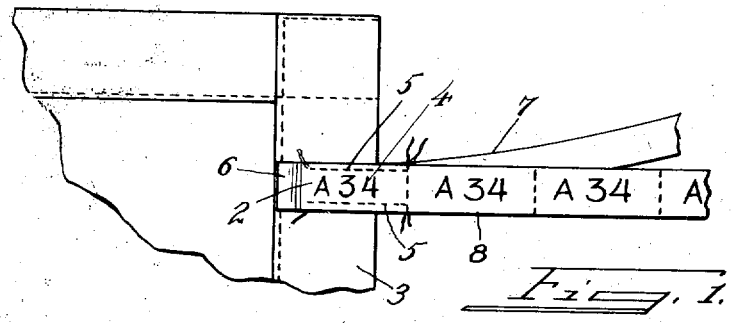
Figure 1 is a perspective view showing the method of attaching the tag to a napkin.

While I describe a convenient method of attaching my novel tag, I do not wish to limit the invention to this method alone, since in this application I desire to cover the tag itself as an article of manufacture.

In essence the tag comprises two pieces of tape or other fabric of convenient size as indicated at 1 and 2, one of which pieces is on one side and one on the other of the article 3, which is to be marked. As shown in the drawings, the one piece of tape has a distinguishing number or mark 4 thereon while the other may be left blank. A desired number of rows of stitches 5, 5, are formed running lengthwise of the tag, said stitches being preferably such as will readily rip apart upon pulling the pieces of tape in opposite directions.

As shown in the drawings, the tag is not stitched to the fabric for a short space as at 6 where it lies on the garment, so that the ends are free to be pulled apart. Also I prefer to have the tag protrude somewhat from the edge of the article that is to be identified, so that it can be readily cut off when being mounted by machinery without danger of cutting the fabric.

Thus in marking a piece of fabric it is evident that I may employ two lengths of tape as at 7 and 8, and thrust the fabric between them in a stitching machine with the result that the stitching will begin at the correct point on the tag and so that when the needles have finished stitching the tag pieces together with the fabric between them, they may continue to form the lines of stitches to a point beyond the edge of the article to be marked.

The machine may then embody a knife to cut off the tag and the threads at a point removed from the edge of the article, leaving the tape and needles ready for another article.

Figure 2:
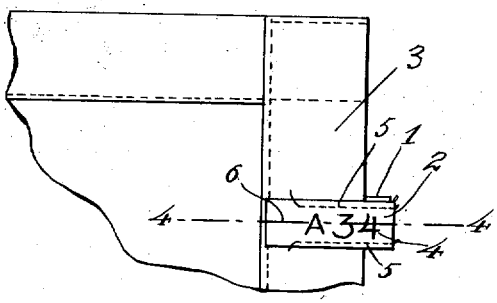
Figure 2 is a like view showing the tag in place.
Figure 4:
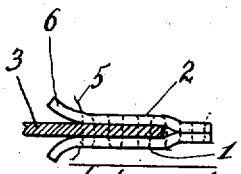
Figure 4 is a sectional view taken through the tag with a piece of fabric embraced within it.

One method of practice possible with my tag will be to give each customer's articles the same mark, such as A34 (Figures 1 and 2). This mark will then indicate one customer's goods which after it has gone through the laundry process will be assembled in a special bin for bundling.

If desired the tags may then be removed before packing the goods for transportation to the owner, and preserved as a check against the proper number of articles sent out and received.

Figure 3:
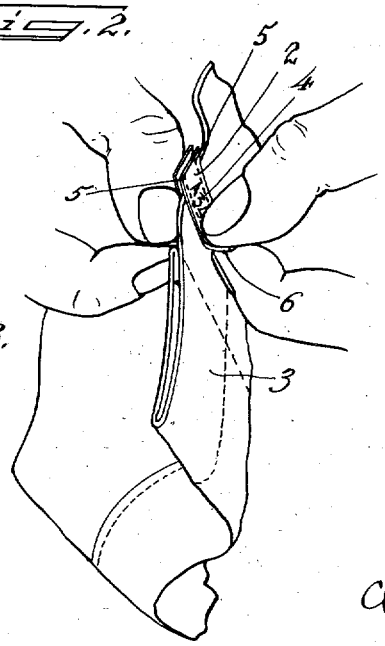
Figure 3 is a perspective view showing the convenient method of ripping off the tag.

I have found that the tag may be torn off from a piece of the finest lace or sheerest lawn without any strain on it whatever. The operator in the preferred manner will grasp the free ends of the tag pieces at 6 (Figure 3) and rip them apart with the result of breaking the threads where they engage the portions of the tag pieces without affecting the article lying between them.

The tags never come off in the laundry because the strains there could not act to rip them apart and while I have shown a piece of tape previously numbered as a part of the tag it should be noted that the tag may be marked before or after it is mounted on the piece of fabric to be laundered.

Having thus described my invention, what I claim as new and desire to secure by Letters Patent, is:

1. A marking tag, comprising essentially strips of tape mounted upon opposed faces of an article to be identified and fastened together through the article by suitable fastening passing through the tape and the article, whereby the strips may be torn apart with the strain of the fastening confined to the tape and leaving the interlying article free.

2. A marking tag, comprising essentially strips of flexible material mounted on opposed faces of an article to be identified, and stitched together through the article with the stitches terminating short of that end of the strips, which lies on the article so as to leave an unstitched end for easy grasp, when tearing off the tag.

3. A marking tag, comprising essentially strips of flexible material mounted on opposed faces of an article to be marked and extending beyond the edge of such article, said strips being stitched together through the article, whereby the strips may be torn apart without straining the fabric and the extending portions permit the use of a length of tape in making up the tags, which tape may be cut off at said extending ends without danger of cutting into the article being marked.

4. A marking tag, comprising essentially strips of flexible tape mounted on opposed faces of an article to be marked and extending beyond the edge of such article, said pieces being stitched together through the article, said stitches so arranged as to leave a desired portion thereof which overlies the article being marked to be free of stitches, as and for the purposes described.

5. A marking tag, comprising essentially strips of flexible material mounted on opposed sides of an article to be identified, said pieces being stitched together through the article, said stitches so arranged as to leave a desired portion of the material of the strips free of stitches, for the purpose described.

6. A marking tag, comprising a linear member of flexible nature, said member bearing an identification mark, stitches for securing said member to an article to be marked, and means independent of the article and comprising part of the tag for receiving the engagement of the said stitches after they have passed through the fabric from the linear member.

7. A laundry identification tag comprising two independent tag members, said tag members being applied on opposite sides of a laundry article, and a row of stitches passed through both tag members and through the article to be marked, said row of stitches being terminated a sufficient distance from one end of the tag to form two unconnected tag member ends, which may be conveniently grasped by an operator, said parts being so arranged and constructed that the two tag members may be grasped at the ends projecting beyond the stitches and forcibly separated with the result of breaking the threads where they engage the portions of the tab pieces without affecting the article lying between them.

CHESTER W. CANINE.